Jan. 22, 1963   R. L. LAING   3,074,207
COMPOSITION AND DEVICE FOR TREATING TREES
Filed April 20, 1959
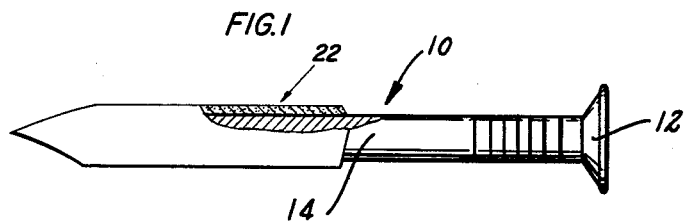
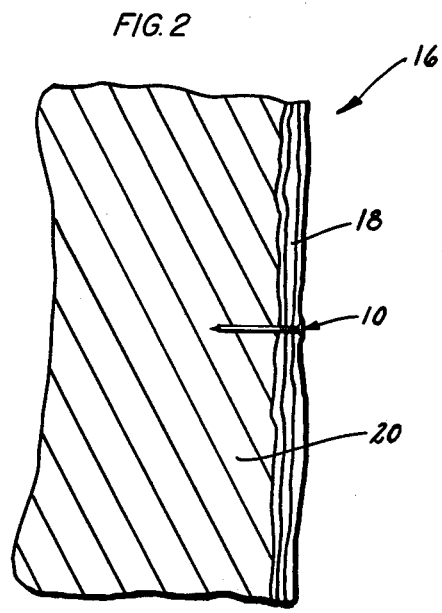
INVENTOR.
ROBERT L. LAING
BY
SMITH, OLSEN, LEWIS & McRAE
ATTORNEYS

United States Patent Office 3,074,207
Patented Jan. 22, 1963

3,074,207
COMPOSITION AND DEVICE FOR
TREATING TREES
Robert Louis Laing, 8624 Guadalupe Road,
Fort Worth, Tex.
Filed Apr. 20, 1959, Ser. No. 807,275
2 Claims. (Cl. 47—57.5)

This invention relates to a composition and device for treating trees. More particularly my invention relates to a composition of fertilizer materials which are combined with an apparatus using a method of coating a nail with ocean salt and trace elements for implanting fertilizer materials directly into the growing plant tissue.

This application is a continuation-in-part of the application 672,488 filed July 17, 1957, now abandoned.

Heretofore and up to the present time several methods and devices have been used for the purpose of fertilizing or otherwise treating trees. Hollister devised a hollow capsule containing a tree treating composition (Hollister; 1,999,458; April 30, 1935); Sherman devised a fertilizing plug which is forced into the ground adjacent to a plant (Sherman; 667,467; February 5, 1901); Antrim devised a wooden spike with grooves cut in it, which contains a tree treating composition and which is driven into the soil (Antrim; 2,067,589; January 12, 1937); Chandler et al. (reprint from American Society for Horticultural Science, Chandler et al.—Soil Treatment, Vol. 30, 1933, pages 70–86, specifically pages 78 and 79) experimented with zinc-coated nails or triangles which were driven into trees. An Italian patent (Italian; 422,275; June 13, 1947) discloses a method of introducing copper into a plant by means of galvanic action. A German patent (German; 388,566; January 15, 1924) discloses the use of a hollow wooden peg containing a plant treating mixture which is driven into holes bored in trees. Another German patent (German; 314,506; December 17, 1919) discloses the use of a stick which is dipped in glue containing the compound used for dipping seed potatoes and is then driven into seed potatoes. Numerous other investigators disclose the importance of trace elements in the normal growth of plants or trees and describe these trace elements used by being mixed with fertilizers to go on or into the ground or used in sprays:

Froug, Emil: Mineral Nutrition of Plants; University of Wisconsin Press, 1951.
Gericke, William F.: The Complete Guide to Soilless Gardening; Prentice Hall, Inc.; New York; 1940.
Gilbert, Frank A.: Mineral Nutrition of Plants and Animals; University of Oklahoma Press; Norman, Oklahoma, 1948.
Underwood, E.J.: Trace Elements in Human and Animal Nutrition; Academic Press, Inc.; 1956.
Wallace, T.: The Diagnosis of Mineral Deficiencies in Plants by Visual Symptoms; Chemical Publishing Company; 1953.
Wallace, T.: The Diagnosis of Mineral Deficiencies in Plants; His Majesty's Stationery Office; London; 1943.
Anderson, A. J., and Underwood, E. J.: "Trace Element Deserts"; Scientific American, Vol. 200, No. 1, pp. 97–106; January 1959.
Avery, George, Jr.: "The Dying Oaks"; Scientific American; Vol. 196, No. 5, pp. 112–122; May 1957.
Ellis, Carleton, and Swaney, Miller W.: Soilless Growth of Plants; Reinhold Publishing Corporation; New York, N.Y.; 1938.
McElroy, W. D., and Swanson, C. P.: "Trace Elements"; Scientific American; Vol. 188, No. 1, pp. 22–25; January 1953
McElroy, W. D., and Nason, A.: "Mechanism of Action of Micronutrient Elements in Enzyme Systems"; Annual Review of Plant Physiology; Vol. 5, pp. 1–30; 1954.
Pramer, David: "Antibiotics Against Plant Diseases"; Scientific American; Vol. 192, No. 6; June 1955.
Salisbury, Frank B.: "Plant Growth Substances"; Scientific American; Vol. 196, No. 4, pp. 125–134; April 1957.
Stout, Perry R.; "Micronutrients in Crop Vigor"; Journal of Agricultural and Food Chemistry; Vol. 4, No. 12, pp. 1000–1006; December 1956.
Turner: "Plant Diseases"; Growing Plants in Nutrient Solutions; Agriculture Yearbook; Government Printing Office, 1953.
Weiss, Francis Joseph: "Chemical Agriculture"; Scientific American; Vol. 187, No. 2, p. 16; August 1952.
Went, Frits W.: "Climate and Agriculture"; Scientific American; Vol. 196, No. 6, pp. 82–94; June 1957.

The references cited can be placed in three categories: Devices or compounds placed in the soil; in sprays; or directly into the plant tissue.

Since trace elements are costly, it is not economical to add them to fertilizers, especially when treating trees. When trace elements are placed in the soil, large amounts are washed away with the rains. Another portion forms large molecules with chemicals already in the soil and cannot be absorbed through the cell walls of the roots. Other portions are absorbed by microorganisms, insects or weeds in the soil which may actually attack the tree and destroy it. A further disadvantage is that a highly saturated solution in the soil may cause the osmotic absorption of the roots to reverse, so that the roots are drained of their contents, and dry up and kill the tree.

Experiments have been made with sprays. It was found that the cost is prohibitive in using trace elements. Most of these minerals wash off and are wasted. These compounds will clog up the pores of leaves, reducing respiration. Furthermore a tree cannot absorb minerals in this manner, although very expensive chemicals have been developed which help increase absorption.

However, the most important deleterious effect of using trace elements in fertilizers or sprays is that these minerals must be administered in very carefully controlled minute amounts, and this is not possible at the present time by these methods. While small amounts of trace elements are beneficial to a tree (sometimes as little as ten parts per million of the total weight of the tree) too much of certain of the minerals will overstimulate a tree and kill it.

Past disclosures of implanting minerals directly into the plant tissue are the closest resemblance to my method, although my composition is considerably different from the references. None of the references disclose a mixture which will treat all trace element deficiencies without the necessity of analyzing what the deficiency is. This means that ameteurs cannot treat a tree with relative success. Some of the prior devices and compositions are much more expensive to manufacture than mine. Furthermore these methods leave holes or gashes in the tree thereby being prohibitive since it requires extra care in dressing the tree after application to keep insects or disease out. This would not be practical in treating large orchards where labor would be costly.

The remaining disclosures use only one element so that a large number of deficiencies cannot be cured without very difficult analysis.

It is, therefore, a principal object of the present invention to provide means of supplying all of the trace elements to a tree such that it is not necessary for an amateur to analyze the mineral deficiency which is causing the disorder.

It is a further object to provide a composition which closely simulates the quantitative analysis of plants, except for the macronutrients, which are supplied in present fertilizers in the usual way.

It is a further object to provide extra quantities of the trace elements which are commonly lacking in various localities.

It is a further object to provide trace elements in carefully controlled minute amounts, so that there will be no danger of overstimulating and killing a tree regardless of the size or locality.

It is a further object to provide means whereby trees can be treated for trace mineral deficiencies simply and efficiently with a maximum utilization of the trace elements and a minimum of waste.

It is a further object of this invention to supply trace elements in a manner that they will not have deleterious effects such as clogging pores of leaves, causing osmosis of roots to reverse, or feeding enemies of the tree.

It is a further object to provide a quick, inexpensive means of application which does not require dressing a wound afterwards, or drilling holes or gashing previously.

It is a further object to provide trace elements in a water soluble form so that they can easily be dissolved by sap flowing past the device.

It is a further object of this invention to provide a method that is so simple that a novice can treat a tree for mineral deficiencies.

Other objects of this invention will be apparent to those skilled in the art upon reading the following description:

It has been known generally that the composition of plant or animal cells closely resembles ocean water. Yet the use of ocean salt or ocean water for fertilizing plants had not been established previously. Watering a plant with ocean water will kill it, as a simple experiment will show. I believe that research with ocean salt had ceased at this point until I made further experiments.

It has been generally established that iron, manganese, copper, zinc, molybdenum, boron, chlorine, cobalt, iodine, sodium, barium, and magnesium are necessary for plant life. As a tree produces fruit, sap, wood, or leaves, these elements are leached from the soil. When any one of them is absent the tree ceases to grow or produce, and begins sending out extra roots in search of the element. When there is such a lack, the tree becomes weak and cannot resist disease, its fruit is pithy and unpleasant tasting, as well as lacking in nutritive value. The leaves are small, wrinkled, or splotched with white spots. I have not found a reference that combines all these elements in a commercially feasible product which treats trees for general trace element deficiencies, except as in fertilizer which has the deleterious effects cited above.

I have experimented with both ocean salt, and with various forms of the individual metals. My experiments were all in the form of injections in trees or plants, including injections by means of driving nails coated with chemicals into the cambium layer of trees. These experiments were very successful. In some cases the size of leaves doubled and became dark green instead of mottled. Stems elongated, and fruit became plush. Many experiments were successful using ocean salt alone, affixed to nails with water soluble glue.

The product resulting from these experiments is as follows: To a gallon of water soluble glue, add a half pound of ocean salt (sold commercially). Add one ounce of borax, ⅛ ounce barium sulphate, ½ ounce magnesium hydroxide (milk of magnesia), ¼ ounce copper sulphate, ½ ounce molybdenum-superphosphate, ¼ ounce manganese sulphate, ⅛ ounce cobalto-cobaltic oxide ($Co_3O_4$). Add 40 drops of green vegetable dye to improve the appearance of the product. Dip about a half inch of the tips of thin, short, zinc, galvanized nails into the mixture and allow to dry. This will treat about 20,000 nails. Drive one nail through the bark and into the cambium layer of each tree. No further care is necessary. The sap flowing past the nail will carry off the elements for use. Some of the mixture will scrape off when driven into the tree, but enough will be carried through to supply the tree with its trace element necessities for at least one year. I have tested nails on trees of many types, conditions, and climates. Except for trees already healthy, they have improved the health, growth, and visual appearance in all cases within one or two weeks, and have never harmed a tree.

FIG. 1 illustrates a preferred embodiment of the present invention, while FIG. 2 illustrates its use in a tree trunk. The apparatus of FIG. 1 may be in the form of a nail, generally designated as 10, comprising a head 12 and a shank 14. The surface of the shank is coated with a fertilizing substance 22 containing the desired amounts of micronutrients as previously described. These chemicals are first mixed together with the glue, and the nail is then dipped into the mixture. The coating is then permitted to dry. The nail 10 is particularly designed for use in trees or plants having a woody stem or trunk into which it can be driven. FIG. 2 illustrates the use of a coated nail 10 and shows its position when driven into the trunk 16 of a tree. The shank 14 extends beyond the bark 18 and through the cambium layer and sapwood 20 of the tree. In this cambium layer and sapwood 20, the sap flows to and from the other parts of the tree, such as the leaves, branches and roots.

The fertilizing material carried by the shank 14 is slowly dissolved by the flowing sap and is thus released in minute quantities for distribution through the growing parts of the tree. By this method of application, the fertilizer elements are not absorbed into the tree immediately.

The method of the present invention may also be used beneficially in plants other than trees by the selection of suitable implanting devices, for example a coated pin or needle may be inserted in a plant stem.

In all cases, the process of nutrient absorption by the plant is gradual. Thus the implanted fertilizer and micronutrients will remain available for plant use for extended periods depending on the nature of fertilizing substance, the thickness of the coating and the method of application of the coating to the surfaces of the implanting device employed. These factors may be varied according to the individual needs of a particular application.

While FIGS. 1 and 2 illustrate a nail as the vehicle for carrying the fertilizer, it is obvious that the same objective could be accomplished by use of any suitable rigid body. For example a screw, pin, needle, ring shanked or barbed nail, or other relatively rigid body capable of penetrating or being placed in a plant also would be satisfactory.

It is apparent that those skilled in the art can conceive of the use of different quantities or different compounds containing the trace elements, or of different methods of applying these elements without departing from the original meaning or configuration as I developed it, which is as follows:

As thus described, the composition and device of the present invention is characterized as an improved composite unit that consists in the combination of a solid implanting device, which is coated or composed of a combination of an affixative such as water soluble glue, ocean salt, and extra additions of certain of the trace elements that are likely to be lacking in particular localities.

Having thus described my invention, I claim:

1. A nail of solid implanting device coated by dipping into a mixture of a water soluble glue or affixative which has had ½ pound ocean salt, ½ ounce magnesium hydroxide, ¼ ounce copper sulphate, ½ ounce molybdenum superphosphate, 1 ounce borax, ¼ ounce manganese sulphate, ⅛ ounce cobalto-cobaltic oxide, ⅛ ounce barium sulphate, and 1 ounce zinc sulphate per gallon of glue.

2. The same as claim 1, except a ten percent (10%)

variation in the chemical quantities is a further characterization.

References Cited in the file of this patent
UNITED STATES PATENTS
2,044,063    Dahlberg _____ June 16, 1936

FOREIGN PATENTS
388,566    Germany _____ Jan. 15, 1924
422,275    Italy _____ June 13, 1947

OTHER REFERENCES
Chemical Engineers' Handbook, Second Edition, published by McGraw-Hill (N.Y.) 1941, pages 102, 103, 312, 313, 321, 329 through 333, 340 through 343, and 356 relied upon.

Rumbold-American Journal of Botany, Vol. VII, January 1920, No. 1, page 9.

American Nurseryman, vol. 106, No. 8, Oct. 15, 1957, pp. 100–103, article "Principles Involved in Transplanting Nursery Stock."

Chandler: Amer. Soc. for Horticultural Science, vol. 30, 1933, pages 78–79.

Mokrzhetski Experiment Station Record, vol. 16 (1905), page 982, New Method of Healing and Nourishing Trees.